(12) United States Patent
Luetze

(10) Patent No.: US 8,779,610 B2
(45) Date of Patent: Jul. 15, 2014

(54) WIND ENERGY SYSTEM

(76) Inventor: Henning Luetze, Bad Bentheim (DE)

( * ) Notice: Subject to any disclaimer, the term of this patent is extended or adjusted under 35 U.S.C. 154(b) by 391 days.

(21) Appl. No.: 13/124,168

(22) PCT Filed: Sep. 1, 2009

(86) PCT No.: PCT/EP2009/061255
§ 371 (c)(1),
(2), (4) Date: Dec. 2, 2011

(87) PCT Pub. No.: WO2010/043441
PCT Pub. Date: Apr. 22, 2010

(65) Prior Publication Data
US 2012/0068461 A1    Mar. 22, 2012

(30) Foreign Application Priority Data
Oct. 14, 2008  (DE) .......................... 10 2008 037 449

(51) Int. Cl.
*H02P 9/04* (2006.01)
*F03D 9/00* (2006.01)

(52) U.S. Cl.
CPC ..................................... *F03D 9/003* (2013.01)
USPC .......................................................... 290/44

(58) Field of Classification Search
CPC ............ F03D 9/002; F03D 7/00; F03D 9/003
USPC .................................................... 290/44, 55
See application file for complete search history.

(56) References Cited

U.S. PATENT DOCUMENTS

| 7,190,085 B2 * | 3/2007 | Moehlenkamp ................. 290/44 |
| 7,579,702 B2 * | 8/2009 | Park et al. ........................ 290/44 |
| 7,622,815 B2 * | 11/2009 | Rivas et al. ....................... 290/44 |
| 7,952,262 B2 * | 5/2011 | Wilcox et al. .................... 313/46 |
| 8,188,610 B2 * | 5/2012 | Scholte-Wassink ............ 290/44 |
| 2006/0028025 A1 | 2/2006 | Kikuchi et al. |

FOREIGN PATENT DOCUMENTS

| EP | 1840090 A2 | 10/2007 |
| EP | 2133561 A2 | 12/2009 |
| WO | WO2004/114493 A2 | 12/2004 |
| WO | WO2005/113964 A1 | 12/2005 |
| WO | WO2008/135605 A1 | 11/2008 |

OTHER PUBLICATIONS

International Search Report corresponding to PCT/EP2009/061255 mailed Feb. 1, 2011.

* cited by examiner

*Primary Examiner* — Tulsidas C Patel
*Assistant Examiner* — Sean Gugger
(74) *Attorney, Agent, or Firm* — Chadbourne & Parke LLP

(57) ABSTRACT

The invention relates to a wind energy system having a support (5), a rotor (6) that is rotatably supported on the support (5) about a rotor axis (7), said rotor having multiple rotor blades (9, 10) and being driven or drivable by means of wind energy (15), an electric generator (16) that is coupled to the rotor (6), said generator being drivable or driven by the rotor (6), a first converter (23) that is electrically coupled to the generator (16), said converter being coupled or capable of being coupled to an electric distribution network (27), at least one electric or partially electric auxiliary system (20), wherein the at least one auxiliary system (20) is or can be electrically coupled to the generator (16) while interconnecting a second converter (33).

12 Claims, 3 Drawing Sheets

WIND ENERGY SYSTEM

RELATED APPLICATIONS

Figure 1:
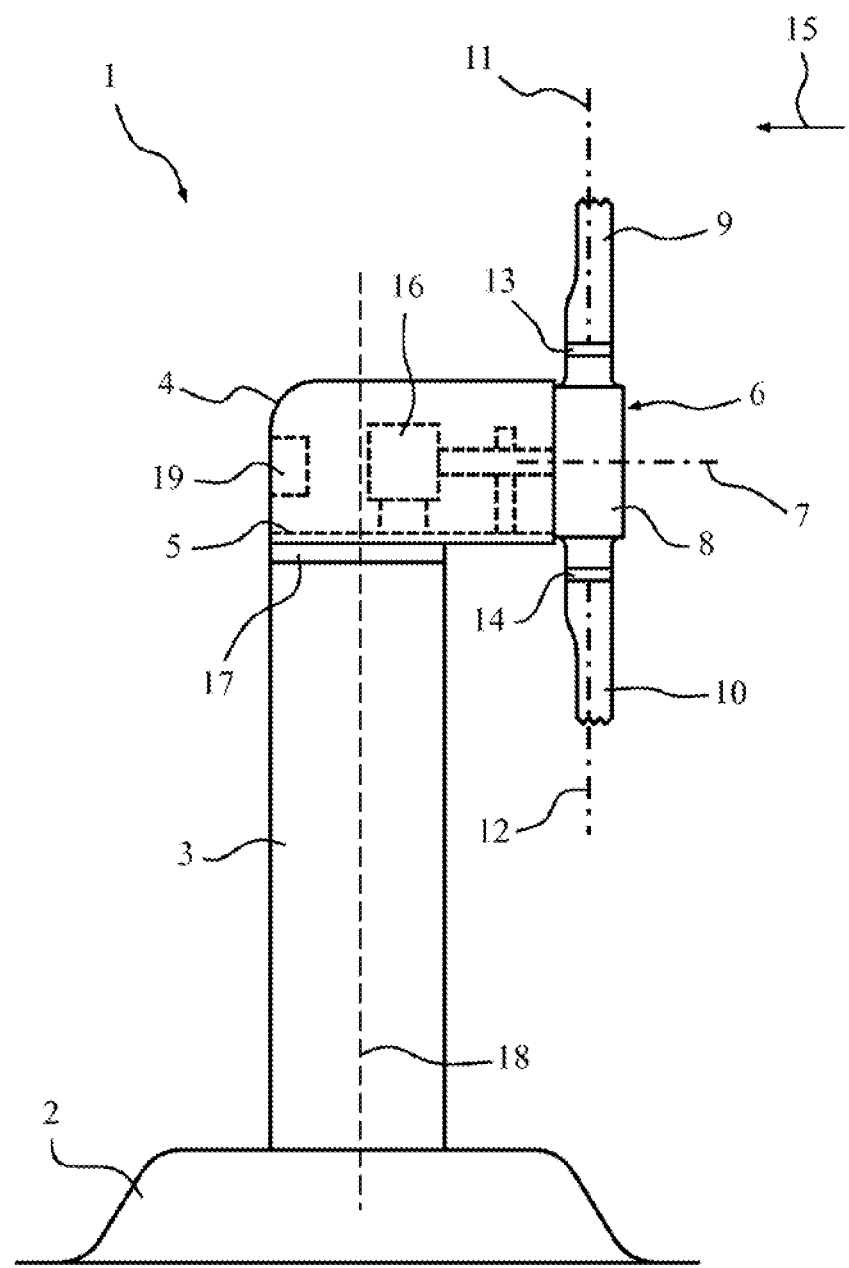

This application is a National Stage Entry entitled to and hereby claims priority under 35 U.S.C. §§365 and 371 corresponding to PCT application No. PCT/EP2009/061255, filed Sep. 1, 2009, entitled "Wind Energy System," which in turns claims priority to Application Serial No. DE 10 2008 037 449.0, filed Oct. 14, 2008, all of which are hereby incorporated by reference.

The invention has to do with a wind energy system with a support, a rotor affixed on the support and turning around a rotor axle, the rotor having multiple rotor blades, and driven or drivable by wind power or drive-capable rotor, an electrical generator coupled to the rotor, which is driven or can be driven by the rotor, a first converter that is electrically coupled with the generator, which is or can be coupled with an electrical distribution network, and at least one electrical, or partially electrical auxiliary system.

Auxiliary systems are used in the wind energy system, which are required for running it, and which have to be supplied with electrical energy. Those are pumps, for example, ventilating fans, controls, and switch devices, etc. Today, a common wind energy system with a high output, i.e. an output of >1 MW, is envisioned for energy supply into public power distribution networks. A network connection is thus—in the normal operating situation of the system—always available. In addition, the supply of the auxiliary equipment of the system, as a rule, is from the common network connection, through which the generator of the wind energy system supplies the network. If the network is not available, or is disrupted, the system can no longer supply the energy distribution network with energy. In addition, if that occurs, the network supply of the auxiliary systems will no longer be ensured. Indeed, there are, as a rule, energy storage units available in the system, but they are only designed for small amounts of power, in order to continue to supply the control of the system with power for a specific time, so that the system can be started up in a controlled manner. In addition, for a system with a rotor blade adjustment, there is energy storage equipment, which can drive the rotor blades into deployment position in either controlled or uncontrolled manner, in order to attain a secure condition for the system.

U.S. Pat. No. 5,907,192 makes known an emergency power system for wind energy systems, which uses a rectifier coupled with a generator, and an inverter coupled with the power network, and located "downstream" of those. An auxiliary network that is connected to the supply network, supplies a direct current bus, through a transformer and rectifier, through which a control system and a pitch control turbine are supplied with electrical energy, that can register a disruption in the supply network. If there is a disruption of the supply network, the control system disconnects the inverter and the auxiliary network, by means of a switch, and couples the auxiliary network with the inverter, using a different switch, so that there is supply of the auxiliary network by the generator, through an interconnection of the rectifier and the inverter. During those switch transactions, capacitors supply the control system with electrical energy.

For that reason, the inverter is disconnected from the supply network, so that the disruptions of the supply network do no affect the auxiliary network. If the inverter is reconnected with the supply network when the disruption is over, the generator voltage must—as a rule—be synchronized with the network voltage of the supply network, so that the switch time is relatively long.

The task of the invention is to supply the auxiliary system with electrical energy, even if the energy distribution network is disrupted, or totally unavailable. In addition, the switch time after the end of the disruption is to be kept as low as possible.

The invention solves this task in the form of a wind energy system, based on Claim 1. Preferred enhancements to the invention are listed in the sub-claims.

The wind energy system of the invention has a support, a rotor that is affixed to the support, and which turns about a rotor axle, having multiple rotator blades, and driven or drivable by the wind power, an electrical generator that is coupled with the rotor, which is driven or drivable by the rotor, a first converter, that is electrically coupled with the generator, said converter being coupled or capable of being coupled with an electric distribution network, and at least one electric or partially electric auxiliary system, wherein at least one auxiliary system is, or can be, electrically coupled with the generator, while interconnecting a second converter.

For the wind energy system that is the subject of the invention, it is possible to supply at least one auxiliary system with electrical energy, even if the distribution network is not available or disrupted, using the generator of the wind energy system. In addition, the electrical supply of the at least one auxiliary system is not dependent on the first converter, so that, preferably, it is connected to the distribution network over a long period of time, and in particular, does not have to be disconnected from the distribution network. The switch time thus is completely circumvented, or at least is reduced. However, that should not be set up in a manner that is limiting, so that it is also possible to disconnect the first converter from the distribution network, if there is a disruption of the distribution network. However, in that case, a relatively long switch time can again occur.

A disruption of the distribution network can mean that the distribution network is totally non-operational. But that does not have to be the case. An undesired voltage and/or an undesired network frequency can result in the disruption of the distribution network. A distribution network can be the public power distribution network, or a local network. A local network can, for example, be a wind energy system network, a wind park network, or a sub-network of a larger network, for example, a wind park sub-network. If the distribution network is a local network that is coupled or can be coupled, it will be—preferably—coupled or can be coupled, directly or indirectly, with the public energy distribution network.

The generator can be an asynchronous machine, and is, for example, designed as a short circuit rotor or slip ring motor. A synchronous machine is the preferred generator type. The electrical coupling of the first converter with the generator can be on the stator side, or on the rotor side. Preferred is the first converter, but electrically connected to the stator windings of the generator. In addition, the electrical coupling of the second converter with the generator can be set up on the stator side, or the rotor side on the generator. Preferred is the second converter electrically connected with the stator windings of the generator.

The first converter is, for example, designed as a frequency converter. In particular, the voltage given off by the first converter and/or its frequency can be kept stable, if the generator speed varies due to changing wind conditions. The wind energy system can thus have a speed-variable drive, and/or be driven in a speed variable manner. The first converter has a rectifier that is electrically coupled, or can be coupled, with the generator, and an inverter "downstream" from that, which is coupled with or can be coupled with the distribution network. In particular, the inverter is coupled with the distribution network, over long time periods. Preferred is that the rectifier is coupled over long time periods with the generator. Preferably, the inverter is set up "downstream" with respect to the rectifier, preferably interconnecting a direct current intermediate circuit of at least one capacitor.

The second converter is, for example, designed as a frequency converter, or as a rectifier. The second converter is coupled directly with the generator. For generators that are working and operational, and networks that are either disrupted or unavailable, the second converter and, thereby, at least one auxiliary system, can be supplied by the generator with electrical energy. In addition, it is possible that the second converter supplies at least one auxiliary system with electrical energy or power, and/or voltage with a frequency, that differs from the network frequency of the electrical distribution network. In that way, the frequency of the electrical energy fed into at least one of the auxiliary systems is optimized, at least for the auxiliary system, independent of the frequency of the distribution network. Preferably, the operating frequency of at least the one auxiliary system will be in the range of 0 Hz to 5 KHz.

The second converter is on the input side, preferably interconnecting at least one switch, electrically connected with the generator, or can be connected. In that way, the second converter can be separated from the generator. In addition, the second converter is on the output side, preferably connecting at least a second switch, electrically connected, or can be connected with at least an auxiliary system. In that way, the second converter can be separated from at least one auxiliary system.

In accordance with an initial operational type, the generator supplies the second converter with electrical energy, whereby the second converter supplies at least one auxiliary system with electrical energy. To do that, the first and second switches are closed.

The second converter has—in particular—a rectifier that is electrically coupled with the generator, or can be coupled with it, and an inverter that is "downstream" from it, and that is coupled with at least one auxiliary system, or can be coupled with it. Preferably, the second converter has an additional rectifier, which is coupled, or can be coupled, with the distribution network. The inverter is—in particular—set up downstream of both rectifiers, whereby the rectifiers on the output side are interconnected. The additional rectifier is connected, or can be connected, electrically with the electrical distribution network, preferably interconnecting at least a third switch. In that way, it is possible to supply the second converter with power from the electrical distribution network, by opening the first switch, and by closing the third switch. As an alternative, the second converter can be supplied with electrical energy from the generator, by closing the first switch and opening the third switch. The inverter is "downstream" from the rectifiers, preferably interconnecting at least one capacitor, within a direct power circuit. In addition, a boost converter can be set up between the rectifier(s) and the inverter, and the direct circuit intermediate circuit.

According to a second operating type, the second converter is supplied with electrical energy from the distribution network, whereby the second converter supplies at least one auxiliary system with electrical energy. In particular, one can switch between the first and second operating type. For that switch, a switch can be provided, through which the input of the converter is coupled, or can be coupled, as one chooses, with the generator and/or with the distribution network. Preferably, in the second design, the second and the third switches are closed. In addition, the first switch can be opened.

Preferred is that at least one auxiliary system, interconnecting at least a fourth switch, is connected, or can be connected, with the electrical distribution network. In that way, it is possible to supply at least one auxiliary system with electrical energy from the distribution network, by closing the fourth switch directly, without interconnecting the second converter. In particular, the second switch is open.

In accordance with a third design type, at least one auxiliary system is supplied with energy from the distribution network, without interconnecting the second converter. To do that, the fourth switch is closed. In addition, the second switch can be opened. That design is relevant, in particular, for a distribution network that is relatively stable.

In that way, it is possible to supply at least one auxiliary system with electrical energy from the distribution network, if there is an intact distribution network and insufficient generator output. In the second operating type, the supply of at least one of the auxiliary systems is done through the distribution network, interconnecting the second converter (indirect), and in the third design, the supply of at least one auxiliary system is done through the distribution network, without interconnecting the second converter (direct).

The distribution network has several, in particular three phases, so that the third and/or fourth switch preferably have a multi-phase, in particular three-phase design. In addition, the generator creates electrical energy, preferably in multiple phases, so that also the first converter, the second converter, and/or the first switch are set up in a multi-phase, and in particular, in a tri-phase manner. In addition, the second switch is preferably multi-phase, in particular tri-phase.

In accordance with an enhancement of the invention, the second converter is connected with a control, by means of which an operating dimension of at least one auxiliary system is controlled, or can be controlled. Preferred is that at least one operating dimension is measured by the control, which, by controlling or steering the second converter, keeps or can keep the at least one operating dimension in specific ranges or limits. The at least one operating dimension comprises the voltage given off from the second converter to at least one auxiliary system, and/or its frequency, so that, by means of the control, the voltage given off from the second converter to at least one auxiliary system, and/or its frequency, is controlled or can be controlled. The control encompasses—in particular—a type of control for the voltage given off from the second converter to at least one auxiliary system, and/or its frequency, so that that voltage and/or frequency can be kept stable, or within specific limits.

The wind energy system has a wind energy system control that measures at least one operational dimension of the first converter, and/or of the generator. As part of that, the wind energy system control controls or governs, for example, the generator output, in dependence on the measured operating dimension. In particular, at least the one operating dimension comprises the generator output, or one of those characterized dimensions.

Preferably, at least the one auxiliary system, or at least one of the auxiliary systems, in particular by means of the wind energy system control, can be electrically disconnected from the second converter. In that way, if there is too little output, it is possible to disconnect one or at least one auxiliary system. It is preferred that in particular, by means of the wind energy system control, at least one additional auxiliary system can be electrically coupled with the second converter, in particular if the generator output is high or too high.

The rotor has a rotor hub, on which the rotor blades are affixed. Preferably, at least one rotor blade, or one of the rotor blades, can move around its axle, by means of a rotor blade adjustment drive. In particular, the rotor blade adjustment drive is controlled or governed by means of the wind energy system control.

According to an enhancement of the invention, the control measures at least one operating dimension of the first converter and/or of the generator. In particular, the control can turn off or govern at least the one auxiliary system, or one of the auxiliary systems, so that, if the generator output is too low, by turning off or governing the output requirement, the output delivered by the generator can be adjusted. Preferably, the control can govern the generator output and/or engage at least one auxiliary system, so that, if generator output is high or too high, the control can down-regulate and/or at least engage one of the additional auxiliary systems. The down-regulation of the generator output is done, for example, directly, or interconnecting the wind energy system control, by adjusting the rotor blades. Shutting off or turning on an auxiliary system is done in particular, in that it is disconnected or coupled with the second converter. The at least one operating dimension comprises the generator output, or one of these characterized dimensions.

Preferred are several auxiliary systems, interconnecting the second converter electrically with the generator. In addition, that comprises at least one auxiliary system, or encompasses the auxiliary system, for example an azimuthal drive system (yaw drive), at least one rotor blade adjustment drive, at least one heating (unit), at least one cooling (system), at least one control, at least one ventilator fan, at least one pump, at least one phase compensation device and/or at least one energy storage unit. In particular, the auxiliary system encompasses at least one heating unit, cooling unit, and/or additional consumer, which, if there is a stoppage of the electrical distribution network, can be supplied by the generator with electrical energy. In that way, operating equipment and substances (fluids, etc.), of the wind energy system can be kept at a desired temperature, or at a minimum temperature.

According to the invention enhancement, a protective circuit, preferably in the form of a brake chopper, is set up in the intermediate circuit. The protective circuit can be used to limit the intermediate circuit voltage of the first converter. In particular, the protective circuit and/or the brake chopper is used to load the generator, when the network is either not available, or is disrupted, with the goal of creating a minimum torque on the gear shaft of a gear, so that, preferably is set up between the rotor and the generator. That prevents the bearings in the gear from sliding through due to the low load, instead of rolling on the rolls or balls. Sliding through can result in the lubricating film tearing the rolling bearings, and grooves and damage resulting in the drive rings of the bearings, which can lead to premature stoppages of gear bearings. The protective circuit and/or the brake chopper are governed from the wind energy system control in such a way that generator output that cannot be provided into the disrupted network, is converted into heat in one or more of the resistors. It is thus possible to operate the system at low speed for its own use, with no danger for the gears, if there is no network, or if the network is disrupted. The resistor(s) are part of the protective circuit and/or of the brake chopper.

In summary, one can say that the supply of the auxiliary system of the wind energy system, which has a speed-variable drive, with a converter for the main drive (first converter or main converter) of the wind energy system, are set up in the form of a converter (second converter or auxiliary converter), which is connected on the stator side or on the rotor side to the generator of the wind energy system. The task of the converter, for the auxiliary system (second converter) lies in creating the voltage and the frequency that is required to operate the auxiliary system, and to govern specific limits. The converter for the auxiliary system is preferably connected with a control that measures at least one operating dimension of the auxiliary system, and that keeps the required operating dimensions of the auxiliary system in the specific limits, by means of that converter. If the generator output is too low, the control can, for example, adjust the output requirement to the supplied output, by switching away or controlling the consumer (auxiliary system). If the output from the generator is too high, the control can, for example, directly or indirectly switch the output that is created, using the wind energy system control, by adjusting the rotor blades, to down-switch to the required value, and/or switch on additional auxiliary systems. The control thereby measures preferably at least one operating dimension of the converter for the main drive, or of the generator, for use in governing the generator output. If there is an existing available network, and wind speed is too low, the auxiliary systems e.g. will be supplied through the converter for the auxiliary system, directly from the network. The auxiliary systems of the wind energy system can be operating independently of the network relationships. If the network is not available, or stops working, all the auxiliary systems are available and are supplied with energy by the generator of the wind energy system, as long as there is enough wind speed available. In particular, the auxiliary systems are independent of the specific network frequencies of e.g. 50 or 60 Hz. In addition, it is possible to put into operation the wind energy system or a wind park with wind energy systems that are the subject of this invention, whose network connection is only determined after setting up the wind energy systems. As long as sufficient power is created to operate the auxiliary systems, prolonged cooling out and condensation in the system parts is prevented. Stoppage marks in the bearings, which lead to the bearing prematurely wearing out, can be prevented.

The supply of the second converter with alternating voltage of at least one phase occurs in the preferred range, through the direct coupling of the second converter with the generator. That is enabled by closing the second switch. Only when the generator voltage or power is no longer enough to sufficiently supply the "on-board" power supply or at least one auxiliary system, will a switch of power supply from the second converter directly to the distribution network occur, by opening the first switch, and by closing the third switch. That occurs, for example, by starting up the wind energy system, or as soon as the wind speed drops in operation so much, that the generator speed is no longer sufficient, or in disruptions of the wind energy system, in which braking must occur. When the "on-board" power supply stops, e.g. when the second converter stops working, the possibility still exists of supplying at least one auxiliary system through the fourth switch, directly from the distribution network. In particular, the electrical power supply of at least one auxiliary system is functionally not coupled with the first converter, and is thus independent of it.

The second converter has, preferably, a boost converter. It ensures that the voltage in the intermediate circuit of the second converter can be governed, also if there is variable generator power and frequency, at a constant even voltage, from which the inverter of the second converter can then create a constant three-phase alternating current and frequency. However, the boost converter does not have to be used, particularly in cases in which the generator voltage can be boosted, even at very lows speeds, by means of an excitation actuator, or by capacitors at the stator winding, or when the generator is limited to a very small speed range.

Preferably there will be an improvement of the cold weather behavior, by maintaining temperature levels, even if the network stops working. If the network stops, the supply of heat is provided by sufficient high wind speeds. Thus, the system can be kept longer in "warm" operational condition, which contributes to making the life of the components longer. In particular, condensation in the electrical system and in the gears can be prevented. If the wind speed is higher, the additional consumers can be switched on, in order to maintain the gears and the generator in the warm operating condition, through the increasing losses at higher loads. The wind energy system can be operated and almost fully tested, even if the connection to the supply network (distribution network) is not yet available. In addition, at hot weather locations, it can be cooled, instead of heated. Preferred there is a minimum temperature of the operating equipment and substances, also if the network fails or there is a disruption in it for any longer period of time, in particular by means of the supply of at least one heating unit, at least one cooling unit, and/or of at least one additional consumer of the wind energy system, with generator output.

The first converter is connected directly with the distribution network. For wind energy systems with electrical machines, whose windings are directly connected with the distribution network, the problem can arise that the transient processes, when the power returns, cannot be controlled well, and thus the machines must be disconnected from the network by means of protectors, if the network is out of operation for any longer period of time. For the wind energy system that is the subject of the invention, the first converter, however, does not have to be disconnected from the network, and can—after a half network period—again provide, govern, or influence the network dimensions. An electrical machine that is separated by means of protectors needs considerably longer, to be able to be switched again, because the generator voltage needs to be synchronized first with the returning network voltage, and the switch time for the output protector is in the range of 100 milliseconds, and longer.

Through the second converter, components (e.g. motors, transformers) of at least one auxiliary system, which must be set up in a network-dependent manner, must be set up independent of the network frequency. That allows an optimal configuration to be chosen for the wind energy system. The components can be used independently of the power supply-network frequency, and everywhere the same. There thus does not need to be any differences anymore between operating equipment and substances in the system that are designed for 50 or 60 or 16⅔ Hz, but rather, the set up can be of any type, in particular one that is optimal for the system. Supply with direct current, i.e. frequency=0, is also possible. The same applies for the operational power of the components. Any voltage, but preferably 400V to 230V, can be used. In accordance with an enhancement, at least one operating substance or equipment of the wind energy system, at least one auxiliary system, and/or at least one component can be run with an operating frequency that differs from the network frequency of the distribution network.

Figure 2:
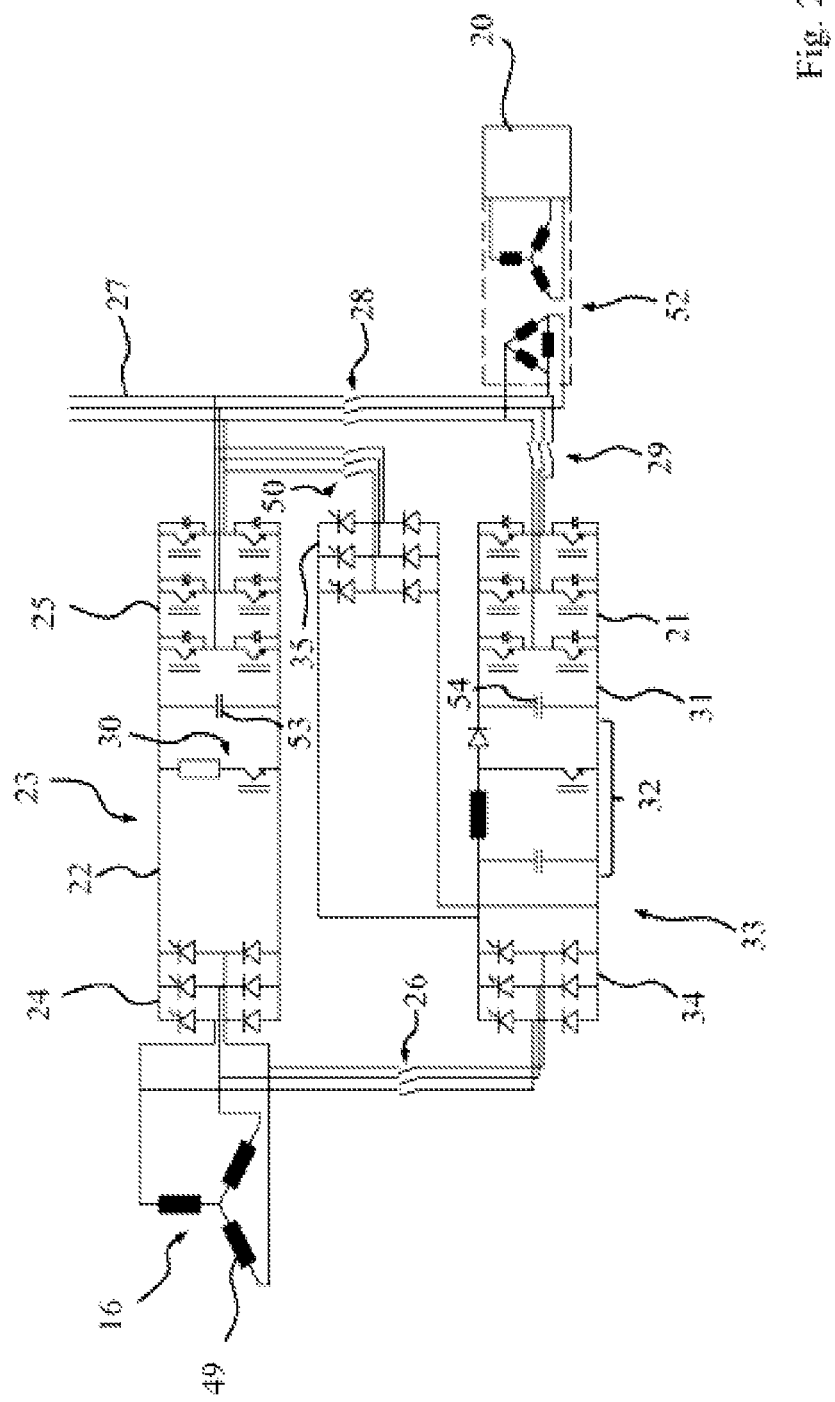
Figure 3:
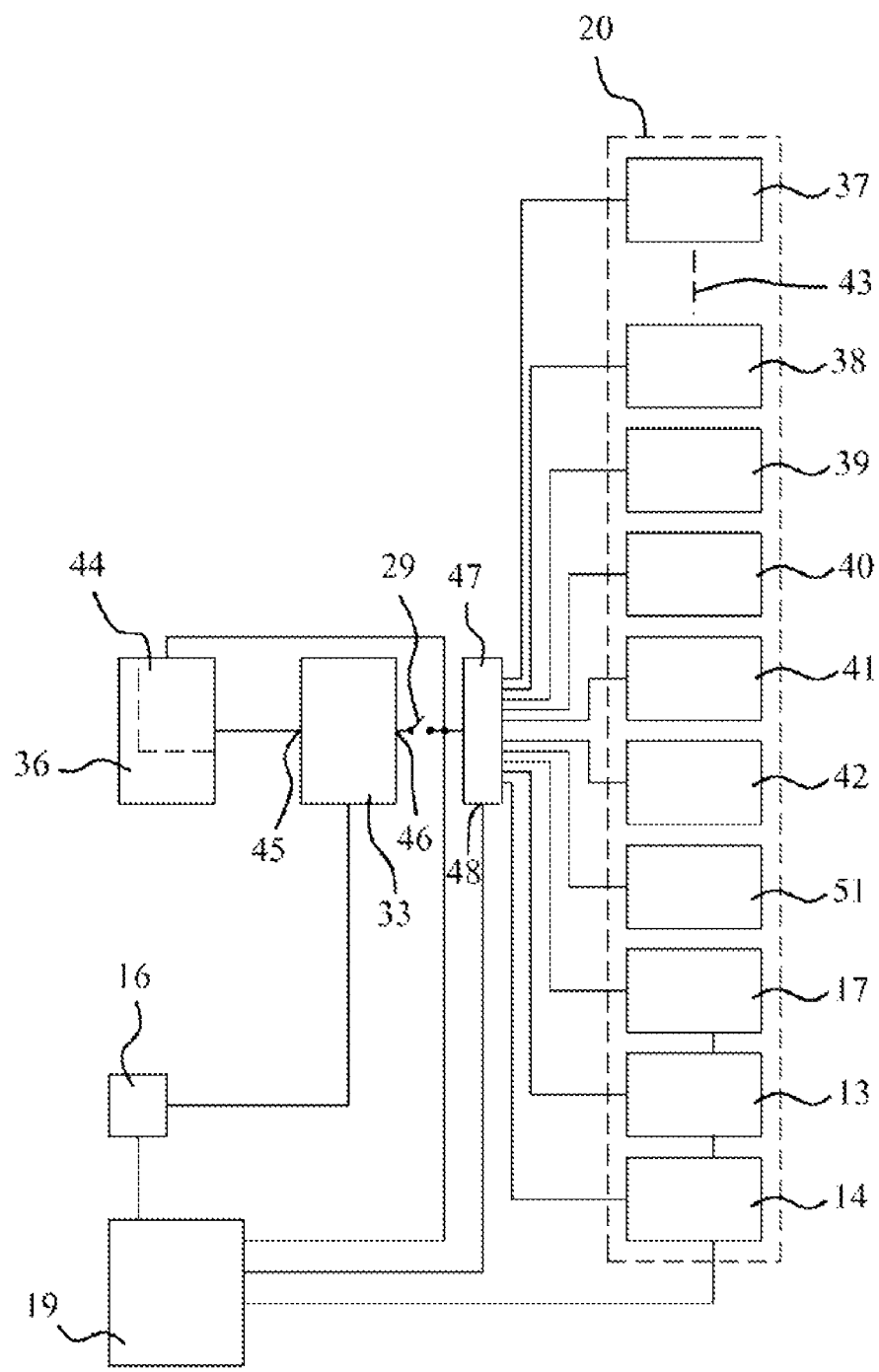

In what follows, the invention is described using a preferred design form, taking into account the drawing. The drawing shows:

FIG. 1 a schematic representation of a wind energy system, in accordance with a design form of the invention, FIG. 2 a schematic circuit diagram for supplying the auxiliary system of the wind energy system, and FIG. 3 a schematic circuit diagram with a control for the wind energy system.

From FIG. 1, a wind energy system 1 is visible, according to a design form of the invention, whereby a tower 3 standing on a foundation 2, is connected to a machine house 4, at the end turned away from the foundation 2. There is a support 5 affixed in the machine house 4, upon which a rotor 6 is affixed around a rotor axle 7, so that it turns, and which has a rotor hub 8 and rotor blades 9 and 10 connected to it, which are turnable relative to the rotor hub 8, around their blade axles 11, 12. Each rotor blade 9, 10 is mechanically coupled to a variable speed drive 13, 14, by means of which each rotor blade 9 and 10 can turn around its blade axis 11, 12. The rotor 6 is turned by wind power 15 around the rotor axis 7, and is coupled mechanically with an electric generator 16, which is set up in the machine house 4, and is affixed to the support 5. In addition, the machine house 4 can be turned using the yaw drive (azimuthal driving system) 17 around the length axle 18 of the tower 3. A wind energy system control 19 is provided for the controlled areas of the wind energy system 1, by means of which, among other things, the variable speed drives 13 and 14, as well a the yaw drive, can be controlled.

FIG. 2 shows a schematic circuit diagram for supplying the auxiliary system 20, which is, or can be, electrically coupled using a converter 33 with stator windings 49 of the generator 16. In addition, a main converter 23 is provided, which has a rectifier 24 and an inverter 25, which is connected to an energy distribution network 27, for example, the public energy distribution network. As can be seen from the circuit diagram, the rectifier 24 has three diodes, and three thyristors. In addition, the inverter 25 has six IGBTs. The area between the rectifier 24 and the inverter 25 is described as intermediate circuit 22, which has an intermediate circuit capacitor 53. In addition, the intermediate circuit 22 encompasses a protective switch (brake chopper) 30, which annihilates effective power as protection for the IGBTs, when the intermediate circuit power is too high. The rectifier 24 is coupled electrically with the stator winding 49 of the generator 16, which feeds in electrical energy in normal operation, into the energy distribution network 27, interconnecting the converter 23. Multiple of those main converters can be set up, which are connected on the exit side with the distribution network 27, and on the input side, with various stator windings of the generator 16.

The converter 33 has a rectifier 34, a boost converter 32 and an inverter 21, which—interconnecting the boost converter 32—is electrically connected with the rectifier 34, whereby the circuit section between the rectifier 34 and the boost converter 32 and the inverter 21 is described as intermediate circuit 31, which has a intermediate circuit capacitor 54. As can be seen from the circuit scheme, rectifier 34 has three diodes and three thyristors. In addition, the inverter 21 has six IGBTs. The rectifier 34 is electrically connected with the stator windings 49 of the generator 16, through a switch 26. In addition, the inverter 21 is connected through a switch 29 electrically, with the auxiliary system 20, which is connected electrically by means of a switch 28 with the energy distribution network 27. The exit of a rectifier 35 is attached to the exit of rectifier 34, whose input is coupled—by means of a switch 50—with the energy distribution network 27. As can be seen from the circuit diagram, the rectifier 35 has three diodes and three thyristors. A transformer 52 can be set up "upstream" of the auxiliary system 20; but that does not have to be used. According to one design form, the transformer 52 can be assigned to the auxiliary system 20.

From FIG. 3, a schematic block diagram with a control 36 is visible, which is electrically coupled with a control input 45 of the converter 33. In particular, the converter 33 is controlled through the gate connections of the IGBTs of the inverter 21. The voltage-providing exit 46 of converter 33 is connected electrically with the switch device 47, which is electrically coupled with the auxiliary systems 20. The transformer 52 can, in so far as it is available, be set up between switch 29 and switch device 47. In addition, the control 36 and the wind energy system control 19 are supplied with electrical power, through exit 46 of the converter 33. The control 36 encompasses the governor 44, which measures the voltage and frequency given off by the converter 33 and its frequency, and keeps them within the allowed limits.

The auxiliary system 20 comprises a heating unit 37, a control 38, a ventilation fan 39, a pump 40, a phase compensation device 41, an energy storage unit 42, a cooling unit 51, the yaw drive 17, and the rotor blade adjustment drives 13 and 14. In addition, other auxiliary systems can be provided, which is indicated by the dashed line 43. The switch device 47 can connect every auxiliary system with the exit 46, and/or disconnect it from it, and thus turn on or turn off the power supply for the relevant auxiliary system. To do that, the switch device 47 is controlled by the wind energy system control 19, which is electrically connected with a control input 48 of the switch device 47.

The wind energy system control 19 measures at least one operating dimension of the converter 23 and/or of the generator 16. If it is determined, using this operating dimension, that the generator performance is too high, the wind energy system control 19 can drive the adjustment devices 13, 14, to turn the rotor blades 9, 10 around the blade axes 11, 12, to reduce the performance, and/or switch on individual auxiliary systems 19 that are not in operation, by means of the switch device 47. In addition, the wind energy system 19 can turn off individual auxiliary systems using the switch 47, when the generator output is too low.

REFERENCE LIST

1 Wind energy system
2 Foundation
3 Tower
4 Machine house
5 Support
6 Rotor
7 Rotor axle
8 Rotor hub
9 Rotor blade
10 Rotor blade
11 Blade axle
12 Blade axle
13 Adjustment drive
14 Adjustment drive
15 Wind
16 Generator
17 Yaw drive (azimuthal drive)
18 Length axle of the tower
19 Wind energy system control
20 Auxiliary systems
21 inverter of the second converter
22 Intermediate circuit
23 First converter
24 Rectifier of the first converter
25 Inverter of the first converter
26 Switch
27 Energy distribution network
28 Switch
29 Switch
30 Protective circuit of the first converter
31 Intermediate circuit of the second converter
32 Boost converter of the second converter
33 Second converter
34 Rectifier of the second converter
35 Additional rectifier of the second converter
36 Control
37 Heating unit
38 Control
39 Ventilating fan
40 Pump
41 Phase compensation device
42 Energy storage unit
43 Additional auxiliary systems
44 Governor
45 Control input
46 Exit
47 Switch device
48 Control input
49 Stator winding
50 Switch
51 Cooling unit
52 Transformer
53 Intermediate circuit capacitor of the first converter
54 Intermediate circuit capacitor of the second converter

The invention claimed is:

1. A Wind energy system, comprising:
a support;
a rotor affixed to the support, and turning around a rotor axle, having several rotor blades drivable by wind power;
a generator coupled with the rotor;
a first converter directly coupled to the generator on an input side of the first converter and electrically coupled directly to an electrical distribution network on an exit side of the first converter; and
a second converter removably coupled directly to the generator on an input side of the second converter via a first switch, removably coupled directly to at least one auxiliary system on an exit side of the second converter via a second switch, and removably coupled to the electrical distribution network on the input side of the second converter via a third switch;
wherein the first converter is a frequency converter; and
wherein the second converter is configured to supply power to the at least one auxiliary system from both the electrical distribution network and the generator.

2. The Wind energy system of claim 1, wherein the second converter has a coupleable rectifier electrically coupled with the generator, and an inverter that is "downstream" from the rectifier, and which is connected to the at least one auxiliary system.

3. The Wind energy system of claim 2, further comprising a boost converter between the rectifier and the inverter.

4. The Wind energy system of claim 2, wherein the second converter includes an additional rectifier, which is electrically coupleable with the electrical distribution network.

5. The Wind energy system of claim 4, wherein the additional rectifier is electrically coupleable with the electrical distribution network via the third switch.

6. The Wind energy system of claim 1 wherein the at least one auxiliary system is coupleable with the electrical distribution network via a fourth switch.

7. The Wind energy system of claim 1, wherein a control electrically coupleable with the second switch is governable by at least one of the operating dimensions of the at least one auxiliary systems.

8. The Wind energy system of claim 7, wherein the control is configured to measure the at least one operating dimension of the at least one auxiliary system, and is further configured to keep the second converter of the at least one operating dimension within specific limits.

9. The Wind energy system of claim 7, wherein the at least one operating dimension comprises at least one of the electrical voltage and the frequency given off by the second converter to the at least one auxiliary system.

10. The Wind energy system of claim 1, wherein the at least one auxiliary system comprises at least one of a yaw drive, a rotor blade adjustment drive, a heating unit, a control, a ventilator fan, a pump, a phase compensation device, and an energy storage unit.

11. The Wind energy system of claim 1, wherein the at least one auxiliary system is configured to be supplied with electrical energy from the generator when there is a disruption of the electrical distribution network.

12. The Wind energy system of claim 1, wherein the second converter is configured to supply the at least one auxiliary system with electrical energy whose frequency differs from the frequency of the electrical distribution network.

* * * * *